(12) United States Patent
Takeda

(10) Patent No.: US 7,612,517 B2
(45) Date of Patent: Nov. 3, 2009

(54) STEPPING MOTOR CONTROLLER AND GAMING MACHINE

(75) Inventor: Kengo Takeda, Tokyo (JP)

(73) Assignee: Aruze Corporation, Tokyo (JP)

( * ) Notice: Subject to any disclaimer, the term of this patent is extended or adjusted under 35 U.S.C. 154(b) by 300 days.

(21) Appl. No.: 11/440,363

(22) Filed: May 25, 2006

(65) Prior Publication Data

US 2006/0267538 A1 Nov. 30, 2006

(30) Foreign Application Priority Data

May 27, 2005 (JP) ............... P2005-156230

(51) Int. Cl.
*G05B 19/40* (2006.01)
(52) U.S. Cl. .................. 318/685; 318/696; 318/807; 318/799; 318/599; 318/811
(58) Field of Classification Search ............. 318/685, 318/696, 798, 799, 599, 811
See application file for complete search history.

(56) References Cited

U.S. PATENT DOCUMENTS 5,929,589 A * 7/1999 Suzuki et al. ............ 318/685
6,003,867 A * 12/1999 Rodesch et al. .......... 273/143 R
6,805,426 B2 * 10/2004 Kokubo et al. ............. 347/19
7,097,264 B2 * 8/2006 Saito et al. .................. 347/5

FOREIGN PATENT DOCUMENTS

| JP | 2003-230686 | 8/2003 |
|----|-------------|--------|
| JP | 2003-230687 | 8/2003 |
| JP | 2005-052420 | 3/2005 |

* cited by examiner

*Primary Examiner*—Walter Benson
*Assistant Examiner*—Renata McCloud
(74) *Attorney, Agent, or Firm*—Arent Fox LLP

(57) ABSTRACT

A stepping motor controller includes: a pulse frequency adjustment circuit that receives a command pulse having a first frequency from an external controller that outputs the command pulse in accordance with an interrupt process performed periodically by the external controller, and generates an alternative command pulse having a second frequency that is lower than the first frequency; and a motor driving circuit that receives the command pulse through the pulse frequency adjustment circuit, and controls a stepping motor to rotate on the basis of the command pulse. The pulse frequency adjustment circuit outputs the alternative command pulse to the motor driving circuit instead of the command pulse received from the external controller, when the first frequency exceeds a predetermined level.

17 Claims, 7 Drawing Sheets

STEPPING MOTOR CONTROLLER AND GAMING MACHINE

CROSS-REFERENCE TO THE RELATED APPLICATION(S)

The present application is based upon and claims priority from prior Japanese Patent Application No. 2005-156230, filed on May 27, 2005, the entire contents of which are incorporated herein by reference.

TECHNICAL FIELD

The present invention relates to a stepping motor controller and a gaming machine provided with the stepping motor controller for controlling a stepping motor, and particularly to a gaming machine having the stepping motor as a source of power for rotating a reel.

BACKGROUND

In a game arcade or a casino, there is installed a gaming machine, such as a slot machine, that provides a game to a user by rotating reels (also called drums) with different types of symbols displayed on surfaces of the reels. The reels are stopped after the rotation, and an award is paid to the player in accordance with the stopped symbols on a pay line.

In a gaming machine having reels, a stepping motor is often used as a drive motor for rotating the reel. Since the stepping motor rotates stepwise in response to an input pulse signal (command pulse), the frequency of the command pulse can be changed for changing the rotation speed of the stepping motor. In the gaming machine, using such a stepping motor, reel rotation control is performed in such a manner that the reel is rotated from a stop state and is stopped from a rotation state by changing the frequency or the period of the command pulse.

Generally, the command pulse given to the stepping motor to perform reel rotation control is generated in interrupt service executed by a microcomputer provided in the gaming machine every predetermined time T (for example, 1 ms (millisecond)). For example, to generate a command pulse in pulse period 5T (for example, 5 ms) at the low-speed rotation time just after rotation starts, an interrupt service program is designed for outputting one pulse each time five interrupt services are executed; on the other hand, to generate a command pulse in a cycle T (for example, 1 ms) at the high-speed rotation time, the interrupt service program is designed for outputting one pulse each time one interrupt service is executed. That is, such a gaming machine controls the rotation speed of the stepping motor for rotating the reel under the control of the software program.

Incidentally, when a load torque exceeding a through torque characteristic (also called continuous characteristic, pull-out torque characteristic) is applied for some reason while the stepping motor is rotating, there is caused a phenomenon called step-out in which the stepping motor becomes impossible to rotate following to the command pulse. Particularly, at a high-speed rotation, high-frequency current becomes hard to flow into a coil of the stepping motor and therefore reduction in the motor torque is remarked and step-out becomes easy to occur.

If such step-out is about to occur, the frequency of the command pulse is lowered (the period can be extended) for circumventing such trouble. However, if the rotation speed is controlled by software as described above, the control is limited to the execution interval T of the periodic interrupt process and thus the command pulse cannot be generated based on intermediate step period ("step period" equivalent to "frequency") like 1.5T although the pulse period can be changed to an integral multiple (for example, from T to 2T, 3T, etc.,). Thus, to lower the pulse frequency to prevent step-out, the pulse frequency is largely lowered, for example, from pulse frequency 1/T (=1000 Hz) to ½T (=500 Hz) and the rotation speed drastically reduces. Accordingly, it becomes difficult to perform proper rotation control of the stepping motor.

SUMMARY

One of objects of the present invention is to provide a stepping motor controller and a gaming machine that perform proper rotation control of a stepping motor.

According to a first aspect of the invention, there is provided a stepping motor controller including: a pulse frequency adjustment circuit that receives a command pulse having a first frequency from an external controller that outputs the command pulse in accordance with an interrupt process performed periodically by the external controller, and generates an alternative command pulse having a second frequency that is lower than the first frequency; and a motor driving circuit that receives the command pulse through the pulse frequency adjustment circuit, and controls a stepping motor to rotate on the basis of the command pulse. The pulse frequency adjustment circuit outputs the alternative command pulse to the motor driving circuit instead of the command pulse received from the external controller, when the first frequency exceeds a predetermined level.

According to a second aspect of the invention, there is provided a gaming machine including: a reel on a peripheral surface of which a plurality of symbols are arranged; a stepping motor that rotates the reel; a controller that outputs a command pulse in accordance with an interrupt process performed periodically; and a stepping motor controller. The stepping motor controller includes: a pulse frequency adjustment circuit that receives the command pulse having a first frequency from the controller, and generates an alternative command pulse having a second frequency that is lower than the first frequency; and a motor driving circuit that receives the command pulse through the pulse frequency adjustment circuit, and controls the stepping motor to rotate on the basis of the command pulse. The pulse frequency adjustment circuit outputs the alternative command pulse to the motor driving circuit instead of the command pulse received from the controller, when the first frequency exceeds a predetermined level.

According to a third aspect of the invention, there is provided a gaming machine including: a stepping motor; a controller that outputs a command pulse in accordance with an interrupt process performed periodically; and a stepping motor controller that outputs to the stepping motor an excitation signal for driving the stepping motor based on the command pulse. When a frequency of the command pulse is a frequency at which a step-out of the stepping motor is to be caused, the stepping motor controller generates an alternative command pulse of a pulse signal having a lower frequency than the command pulse, and outputs the excitation signal for driving the stepping motor based on the alternative command pulse.

DETAILED DESCRIPTION

Referring now to the accompanying drawings, there is shown an embodiment of the invention.

1. Example Configuration of Gaming Machine

A gaming machine according to the embodiment will be discussed by taking a hybrid-type slot machine as an example. However, the present invention is not limited to the gaming machine described herein, and can also be applied to any gaming machine such as a pachinko machine while the gaming machine includes a stepping motor for driving a mechanism such as a reel (also called drum).

Figure 1:
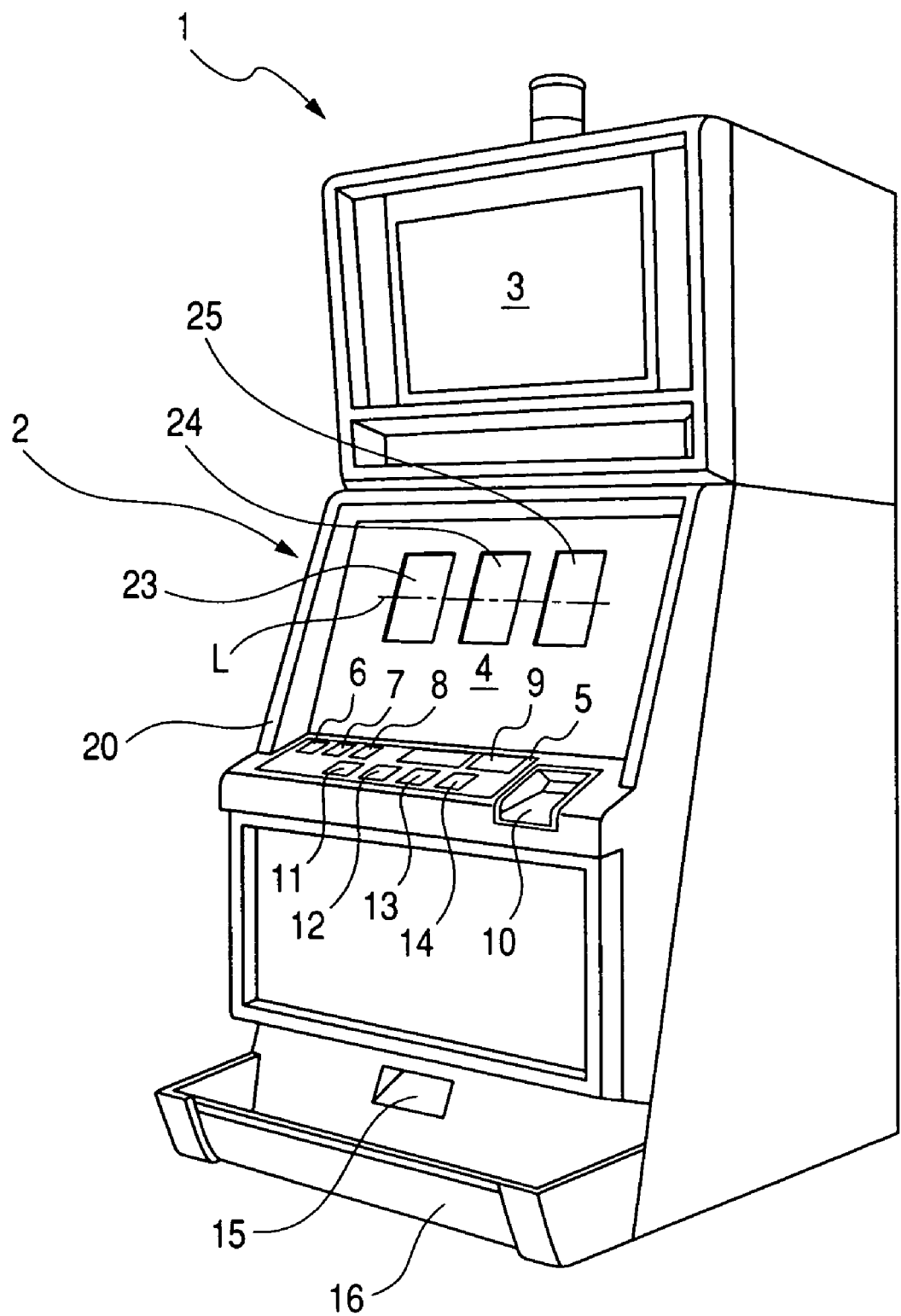
FIG. 1 is an external perspective view of a slot machine.

FIG. 1 is an external perspective view showing a slot machine according to the embodiment. As shown in FIG. 1, the slot machine 1 has a cabinet 2 forming an outer peripheral of the slot machine, and an upper liquid crystal display 3 that is disposed on the front top of the cabinet 2. A lower liquid crystal display 4 is disposed in the front center of the cabinet 2. The upper liquid crystal display 3 is implemented as a generally used liquid crystal display, and the lower liquid crystal display 4 is implemented as a transparent-type liquid crystal display.

The lower liquid crystal display 4 is provided with windows 23, 24, and 25 and the player visually recognizes the symbols placed on the outer peripheries of reels 46, which will be described later, through the windows 23, 24, and 25. The reels 46 are rotatably attached to the inside of the cabinet 2, and are rotated by stepping motors 47 described later.

On a peripheral surface of each of the reels, a plurality of symbols are arranged.

An operation table 5 projected to the front is provided below the lower liquid crystal display 4, and a call button 6, a payback (CASHOUT) button 7, and a help (HELP) button 8 are placed from the left to the right on the operation table 5. A coin insertion section 9 and a bill insertion section 10 are provided to the right of the help button 8. A 1-BET button 11, a SPIN/REPEAT BET button 12, a 3-BET button 13, and a 5-BET button 14 are placed from the left on the front side of the operation table 5.

The call button 6 is a button pressed by the player to call a clerk (shop attendant) for calling a help or for exchanging a bill. The payback button 7 is a button pressed by the player when a base game is over. When the player presses the payback button 7, coins gained by playing a game are paid back to a coin receiving tray 16 from a coin payout opening 15. A payback CASHOUT switch 66 (described later) is provided for the payback button 7. As the payback button 7 is pressed, a switch signal is output to a CPU 30.

The help button 8 is a button pressed by the player when the player is not familiar with the game operation manner and game rules. When the player presses the HELP button 8, various pieces of help information are displayed on the upper liquid crystal display 3 and the lower liquid crystal display 4. A help (HELP) switch 42 (described later) is provided for the HELP button 8. As the HELP button 8 is pressed, a switch signal is output from the help switch 42 to the CPU 30.

A coin sensor 43 (described later) is placed in the coin insertion section 9. When a coin is input to the coin insertion section 9, a coin detection signal is output through the coin sensor 43 to the CPU 30. A bill sensor 44 is placed in the bill insertion section 10. When a bill is input to the bill insertion section 10, a bill detection signal is output through the bill sensor 44 to the CPU 30.

The 1-BET button 11 is a button to bet one at a time each time the player presses the 1-BET button 11. A 1-BET switch 38 (described later) is provided for the 1-BET button 11. As the 1-BET button 11 is pressed, a switch signal is output from the 1-BET switch 38 to the CPU 30.

The spin (SPIN/REPEAT BET) button 12 is a button for starting rotation of the reels described later to start a game according to the current bet count or the preceding bet count as the spin button 12 is pressed. A spin switch 37 (described later) is provided for the spin button 12. As the spin button 12 is pressed, a switch signal is output from the spin switch 37 to the CPU 30. The possible bet count as the spin button 12 is pressed can be in the range of 1 to 5.

The 3-BET button 13 is a button to start a game as a bet count of three as the 3-BET button 13 is pressed. A 3-BET switch 39 (described later) is provided for the 3-BET button 13. When the 3-BET button 13 is pressed, a switch signal is output from the 3-BET switch 39 to the CPU 30. The 5-BET button 14 is a button pressed by the player to start a game as a bet count of five or start a bonus game described later as the 5-BET button 14 is pressed. A 5-BET switch 40 (described later) is provided for the 5-BET button 14. As the 5-BET button 14 is pressed, a switch signal is output from the 5-BET switch 40 to the CPU 30.

In the lower part of the cabinet 2, the above-mentioned coin payout opening 15 is formed and the above-mentioned coin receiving tray 16 for receiving coins paid out from the coin payout opening 15 is provided. A coin detection section 52 made up of a sensor, etc., is placed in the coin payout opening 15 for detecting the number of coins paid out from the coin payout opening 15.

Figure 2:
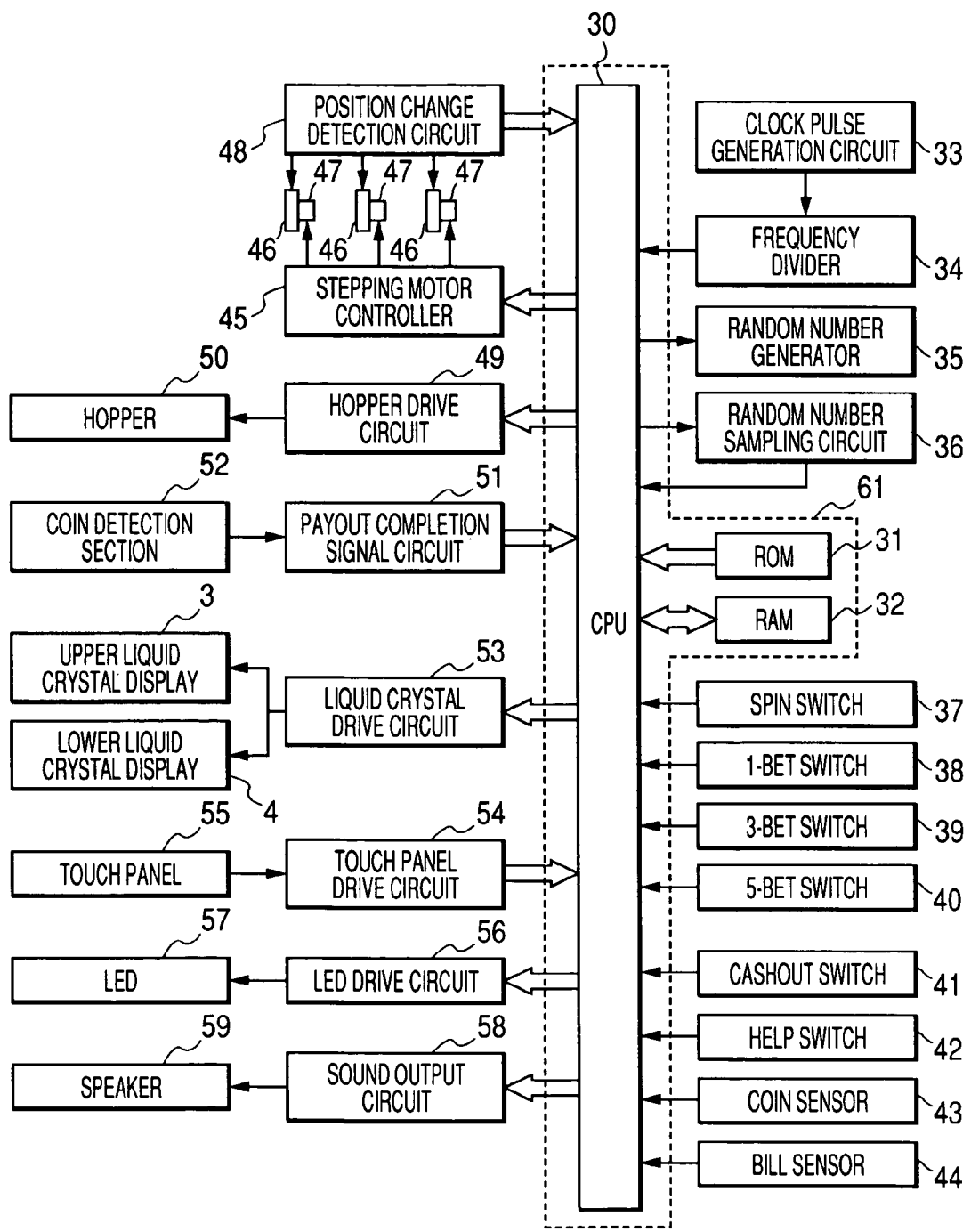
FIG. 2 is a block diagram to show an example of a control system of the slot machine.

Next, the configuration of a control system of the slot machine 1 will be discussed with reference to FIG. 2. FIG. 2 is a block diagram to schematically show the control system of the slot machine 1. In FIG. 2, the control system of the slot machine 1 is basically implemented as a microcomputer 61 centering on the CPU 30 to which ROM 31 and RAM 32 are connected. The ROM 31 stores a game control program, a periodic interrupt process program, various effect programs for producing various effects on the upper liquid crystal display 3 and the lower liquid crystal display 4 with the progress of a game, a lottery table for determining various winning combinations by lottery, and other various programs, data tables, etc., required for controlling the slot machine 1. The RAM 32 is memory for temporarily storing various pieces of data on which the CPU 30 performed operations.

A clock pulse generation circuit 33 for generating a reference clock pulse and a frequency divider 34 are connected to the CPU 30, and a random number generator 35 for generating a random number and a random number sampling circuit 36 are also connected to the CPU 30. The random number sampled through the random number sampling circuit 36 is used for various lotteries of winning combinations, effects, etc. Further, connected to the CPU 30 are the spin switch 37 added to the spin (SPIN/REPEAT BET) button 12, the 1-BET switch 38 added to the 1-BET button 11, the 3-BET switch 39 added to the 3-BET button 13, the 5-BET switch 40 added to the 5-BET button 14, the payback (CASHOUT) switch 41 added to the payback button 7, and the help (HELP) switch 42 added to the help button 8. The CPU 30 controls the slot machine to execute the operation corresponding to each button based on the switch signal output from each switch as each button is pressed.

Further, the above-mentioned coin sensor 43 placed in the coin insertion section 9 and the above-mentioned bill sensor 44 placed in the bill insertion section 10 are connected to the CPU 30. The coin sensor 43 detects a coin input from the coin insertion section 9 and the CPU 30 calculates the number of the input coins based on a coin detection signal output from the coin sensor 43. The bill sensor 44 detects the denomination and the amount of each bill input from the bill insertion section 10 and the CPU 30 calculates the number of coins equivalent to the amount of the bill based on a bill detection signal output from the bill sensor 44.

The three stepping motors 47 for rotating the reels 46 are connected to the CPU 30 via a stepping motor controller 45. A position change detection circuit 48 is also connected to the CPU 30. The reels 46 are rotated by the stepping motors 47 and the stepping motor controller 45. The CPU 30 outputs a command pulse to the stepping motor controller 45 at the periodic interrupt process execution time. The stepping motor controller 45 performs on/off control of the current to motor winding wires while controlling the exciting order of the motor winding wires of the stepping motor 47 in response to the command pulse. However, if the frequency (or pulse period) of the command pulse is a frequency (or pulse period) at which the step-out to be occured, the stepping motor controller 45 internally generates a command pulse (called "alternative command pulse") of a frequency (or pulse period) lower (or longer, in case of pulse period) than the frequency (or pulse period) of the command pulse, and performs on/off control of the current to the motor winding wires while controlling the exciting order of the motor winding wires of the stepping motor 47 in response to the alternative command pulse.

A plurality of (in the example, three) stepping motors 47 for rotating the reels 46 are connected to the CPU 30 via the stepping motor controller 45. When the CPU 30 outputs a motor drive signal (command pulse) to the stepping motor controller 45, each stepping motor 47 is driven by an excitation signal output from the stepping motor controller 45. The CPU 30 counts the number of the command pulses supplied to each of the stepping motors 47, keeps track of the rotation positions of symbols on each reel 46 based on the counted number of the command pulses, and performs controls such as a stop position control for stopping the reels 46.

The position change detection circuit 48 is connected to the CPU 30. The position change detection circuit 48 detects change in the stop position of the reel 46 after stop control by the stepping motor controller 45 described above. For example, in a case where the player forcibly changes the stop positions of the reels 46 so that the stopped symbols become a winning combination, when the reels 46 are not determined to be stopped in a winning combination, the position change detection circuit 48 detects such change in the stop position of the reel 46. The position change detection circuit 48 detects change in the stop position of the reel 46 by detecting a fin attached to the inner portion of each reel 46 at predetermined intervals.

The CPU 30 properly adjusts the tracking of the rotation positions of the symbols on each reel 46 in accordance with the result of the detection performed by the position change detection circuit 48.

A hopper 50 is connected to the CPU 30 via a hopper drive circuit 49. When the CPU 30 outputs a drive signal to the hopper drive circuit 49, the hopper 50 pays out a predetermined number of coins from the coin payout opening 15.

The coin detection section 52 is connected to the CPU 30 via a payout completion signal circuit 51. The coin detection section 52 is placed in the coin payout opening 15. When the coin detection section 52 detects that a predetermined number of coins have been paid out from the coin payout opening 15, the coin detection section 52 outputs a coin payout detection signal to the payout completion signal circuit 51, which then outputs a payout completion signal to the CPU 30.

The upper liquid crystal display 3 and the lower liquid crystal display 4 are connected to the CPU 30 via a liquid crystal drive circuit 53. A graphics board can be used as the liquid crystal drive circuit 53. The upper liquid crystal display 3 and the lower liquid crystal display 4 may be controlled by separate liquid crystal drive circuits. A touch panel 55 is connected to the CPU 30 via a touch panel drive circuit 54.

LEDs 57 are connected to the CPU 30 via an LED drive circuit 56. A large number of LEDs 57 are disposed on the front of the slot machine 1 and are lighted under the control of the LED drive circuit 56 based on a drive signal from the CPU 30 in producing various visual effects. Further, a sound output circuit 58 and a speaker 59 are connected to the CPU 30. The speaker 59 produces various sound effects in producing various audial effects based on an output signal from the sound output circuit 58. A communication interface (I/F) 60 of a communication port for conducting communications between a management unit 102 and the slot machine is provided for the CPU 30.

2. Example Configuration of Drive System of Stepping Motors

Next, the drive system of the stepping motors 47 in the slot machine 1 will be discussed in detail.

In the embodiment, there is assumed that a hybrid (HB) two-phase stepping motor adopting a one-two-phase excitation system (half-step driving system) is adopted as the stepping motor 47. However, the stepping motor 47 is not limited to the two-phase stepping motor and may be a three-phase or five-phase stepping motor. It is not limited to the hybrid (HB) stepping motor either, and maybe a VR (variable reluctance) stepping motor or a PM (permanent magnet) stepping motor.

Figure 3:
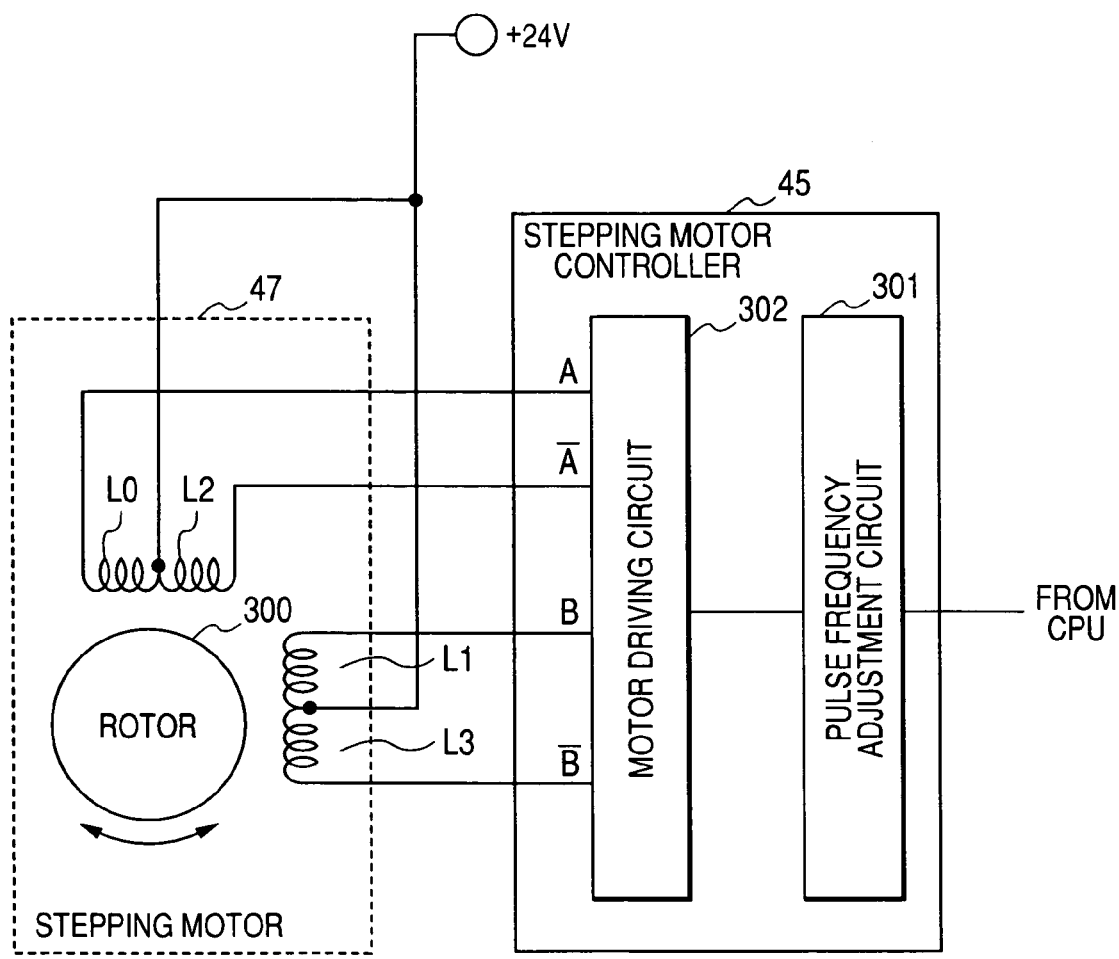
FIG. 3 is a block diagram to show an example of a drive system of a stepping motor.

FIG. 3 is a block diagram showing the drive system of the stepping motor 47.

The hybrid (HB) stepping motor 48 includes a rotor 300 in the center and first to fourth poles (not shown) disposed to surround the rotor 300.

A first excitation coil L0 and a third excitation coil L2 are bifilar-wound around the first and third poles and the winding termination end of the excitation coil L0 and the winding wirestart end of the excitation coil L2 are connected and a predetermined DC power supply (for example, +24 volts) is applied to the connection point. Likewise, a second excitation coil L1 and a fourth excitation coil L3 are bifilar-wound around the second and fourth poles and the winding termination end of the excitation coil L1 and the winding wirestart end of the excitation coil L3 are connected and a predetermined DC power supply (for example, +24 volts) is applied to the connection point.

Here, a phase for applying an excitation signal to the first excitation coil L0 for exciting the first pole to the S pole and exciting the third pole to the N pole is called A-phase; a phase for applying an excitation signal to the third excitation coil L2 for exciting the first pole to the N pole and exciting the third pole to the S pole is called A-bar-phase; a phase for applying an excitation signal to the second excitation coil L1 for exciting the second pole to the S pole and exciting the fourth pole to the N pole is called B-phase; and a phase for applying an excitation signal to the fourth excitation coil L3 for exciting the second pole to the N pole and exciting the fourth pole to the S pole is called B-bar-phase.

Figure 8:
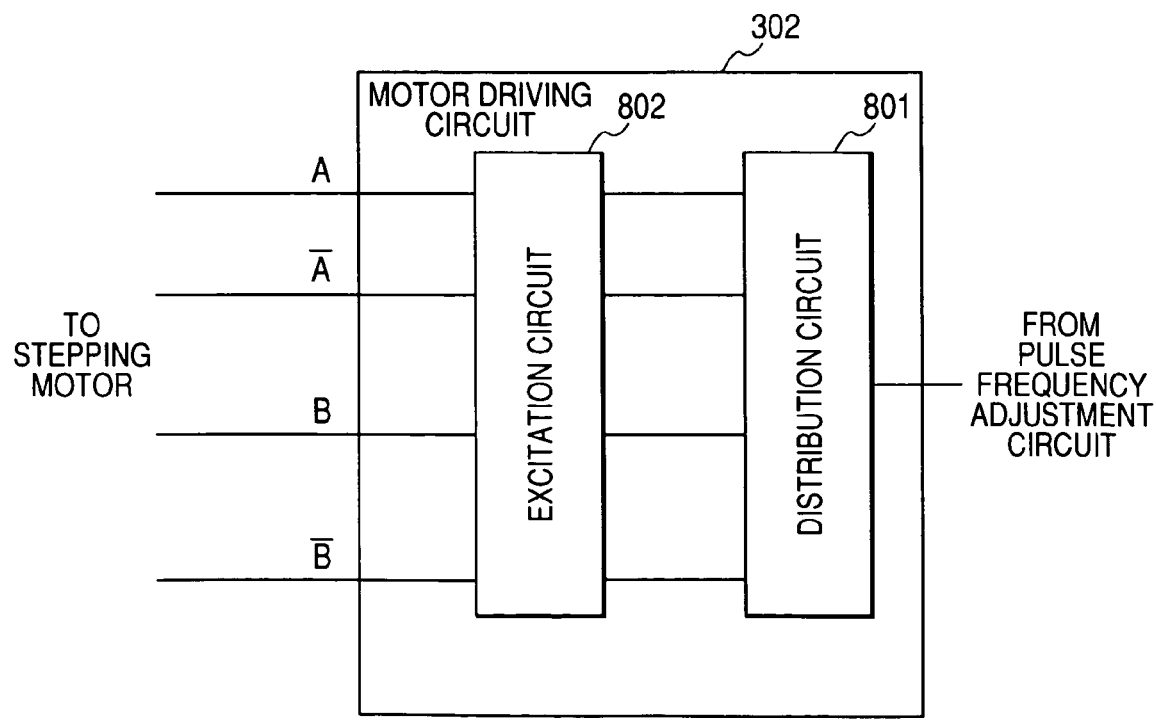
FIG. 8 is a block diagram to show a configuration example of a motor driving circuit.

In FIGS. 3 and 8, the A-bar-phase is denoted by a symbol of a letter "A" with a bar on top thereof, and the B-bar-phase is denoted by a symbol of a letter "B" with a bar on top thereof.

In a one-phase excitation drive system, an excitation signal is applied to the A-phase, the B-phase, the A-bar-phase, and the B-bar-phase in order, whereby the rotor 300 can be rotated clockwise (or counterclockwise).

In contrast, in the embodiment, one-two-phase excitation drive for performing one-phase excitation and two-phase excitation alternately is adopted. In the one-two-phase excitation drive, excitation is executed in the following excitation order of (1) to (9):

(1) A-phase is energized (one-phase excitation);
(2) both A-phase and B-phase are energized (two-phase excitation);
(3) B-phase is energized;
(4) both B-phase and A-bar-phase are energized;
(5) A-bar-phase is energized;
(6) both A-bar-phase and B-bar-phase are energized;
(7) B-bar-phase is energized;
(8) both B-bar-phase and A-phase are energized; and
(9) return to (1).

The stepping motor controller 45 according to the embodiment includes a pulse frequency adjustment circuit 301 and a motor driving circuit 302. The pulse frequency adjustment circuit 301 receives a command pulse having a first frequency from the CPU 30 (controller; external controller) that outputs the command pulse in accordance with an interrupt process (periodic interrupt process) performed (executed) by the CPU 30. The pulse frequency adjustment circuit 301 generates an alternative command pulse having a second frequency that is lower than the first frequency. The pulse frequency adjustment circuit 301 outputs the alternative command pulse to the motor driving circuit 302 instead of the command pulse received from the CPU 30, when the first frequency exceeds a predetermined level, for preventing the stepping motor 47 to be stepped-out.

Figure 4:
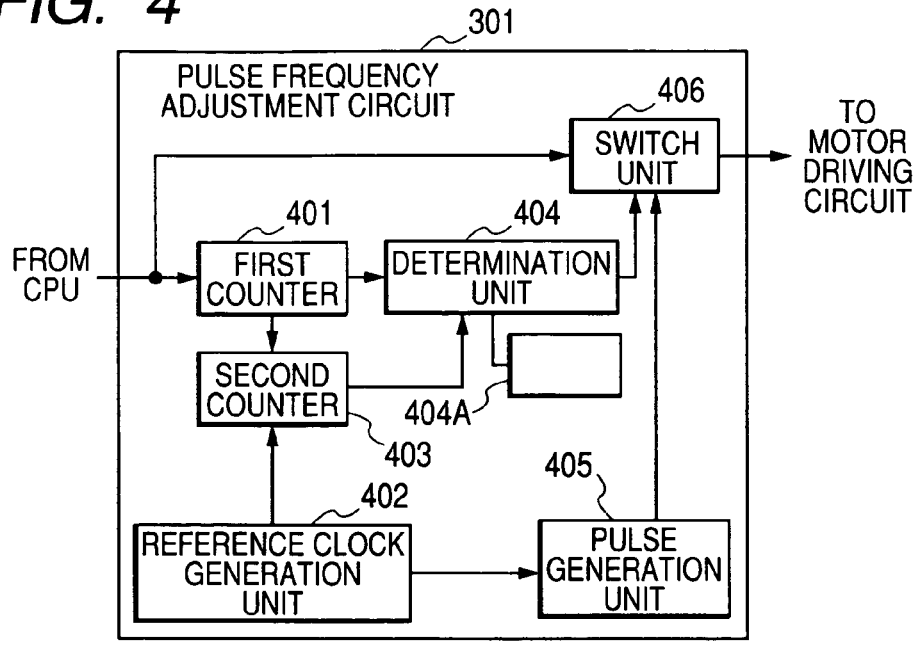
FIG. 4 is a block diagram to show an example of a pulse frequency adjustment circuit.

FIG. 4 is a block diagram to show an example of the pulse frequency adjustment circuit 301. In the example shown in the figure, the pulse frequency adjustment circuit 301 includes: a first counter 401 that receives the command pulse from the CPU 30 and counts a pulse number (first pulse number) of the command pulse; a reference clock generation unit 402 that generates a reference clock pulse having a predetermined frequency; a second counter 403 that counts a pulse number (second pulse number) of the reference clock pulse generated by the reference clock generation unit 402; a pulse generation unit 405 that generates the alternative command pulse (pulse signal) having the second frequency based on the reference clock pulse generated by the reference clock generation unit 402; a determination unit 404 that determines whether to output the alternative command pulse to the motor driving circuit 302 instead of the command pulse received from the CPU 30, by comparing the first pulse number and the second pulse number; a switch unit 406 that outputs one of the command pulse and the alternative command pulse to the motor driving circuit 302 in accordance with the determination made by the determination unit 404.

Figure 5:
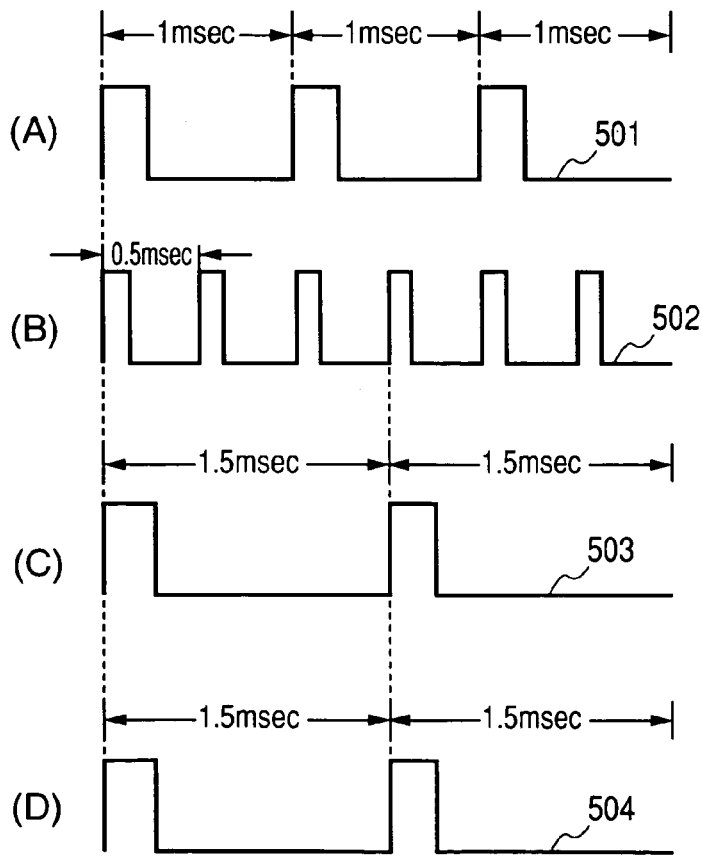
FIG. 5 is a timing chart to show an operation example of the pulse frequency adjustment circuit.

FIG. 5 is a timing chart to describe an operation example of the pulse frequency adjustment circuit 301 if the frequency (or pulse period) of the command pulse received by the pulse frequency adjustment circuit 301 is a frequency (or pulse period) at which the step-out to be occured. In FIG. 5, (A) shows a command pulse 501 input to the pulse frequency adjustment circuit 301; (B) shows a reference clock pulse 502 generated by the reference clock generation unit 402; (C) shows a pulse signal 503 generated by the pulse generation unit 405; and (D) shows a pulse signal (=alternative command pulse) 504 output by the switch unit 406.

The command pulse 501 shown in (A) is a pulse train with pulse period 1 msec (which equals to pulse frequency 1 kHz, 1 kpps (pps: pulse per second)) obtained as the CPU 30 outputs a pulse at a rate of one pulse per periodic interrupt process in periodic interrupt process executed every millisecond (msec) by the CPU 30.

The reference clock pulse 502 shown in (B) is a pulse train with pulse period 0.5 msec (which equals to pulse frequency 2 kHz, 2 kpps).

The first counter 401 issues a determination request to the determination unit 404 each time the counter counts two pulses to examine the pulse frequency or the pulse period of the command pulse 501. Upon reception of the determination request, the determination unit 404 references the count of the second counter 403 and determines whether or not the frequency (or pulse period) of the command pulse 501 is a frequency (or pulse period) at which the step-out to be occured. In the example, while the first counter 401 counts two pulses of the command pulses 501, the second counter 403 counts three pulses of the reference clock pulse 502.

The determination unit 404 is provided with a memory device 404a in which the count—(called limit value) corresponding to the frequency (or pulse period) at which the step-out to be occured—is stored in advance. The example assumes that the limit value is "3". That is, the determination unit 404 operates so as to determine that if the pulse period of the pulse command 501 is equal to or less than 0.5 msec×(3−1)=1 msec (namely, if the pulse frequency is equal to or larger than 1 kHz), the frequency (or pulse period) is the frequency (or pulse period) at which the step-out to be occured.

In the embodiment, the limit value serves as a predetermined level in which to be used by the pulse frequency adjustment circuit to determine whether to output the alternative command pulse to the motor driving circuit 302 instead of the command pulse received from the CPU 30.

In the example shown in FIG. 5, the count of the second counter 403 is "3" and is equal to or less than the limit value and therefore the determination unit 404 commands the switch unit 406 to output the pulse signal generated by the pulse generation unit 405.

In FIG. 5, (C) shows the pulse signal 503 generated by the pulse generation unit 405. In the example, to output a pulse signal having a period 1.5 times the periodic interrupt process execution period 1 msec, the pulse generation unit 405 operates so as to output one pulse each time the pulse generation unit 405 receives four pulses of reference clock pulse 502 from the reference clock generation unit 402. That is, the pulse generation unit 405 outputs the pulse signal 503 with pulse period of 0.5 msec×(4−1)=1.5 msec (which nearly equals to pulse frequency 667 Hz).

The switch unit 406 outputs the pulse signal of the pulse generation unit 405 shown in (C) in accordance with the command of the determination unit 404. Consequently, if the pulse frequency adjustment circuit 301 receives a command pulse with pulse period 1 msec (which equals to pulse frequency 1 kHz), it outputs a pulse signal 504 with pulse period 1.5 msec (which nearly equals to pulse frequency 667 Hz). The pulse signal 504 is output to the motor driving circuit 302 as an alternative command pulse described above.

Figure 6:
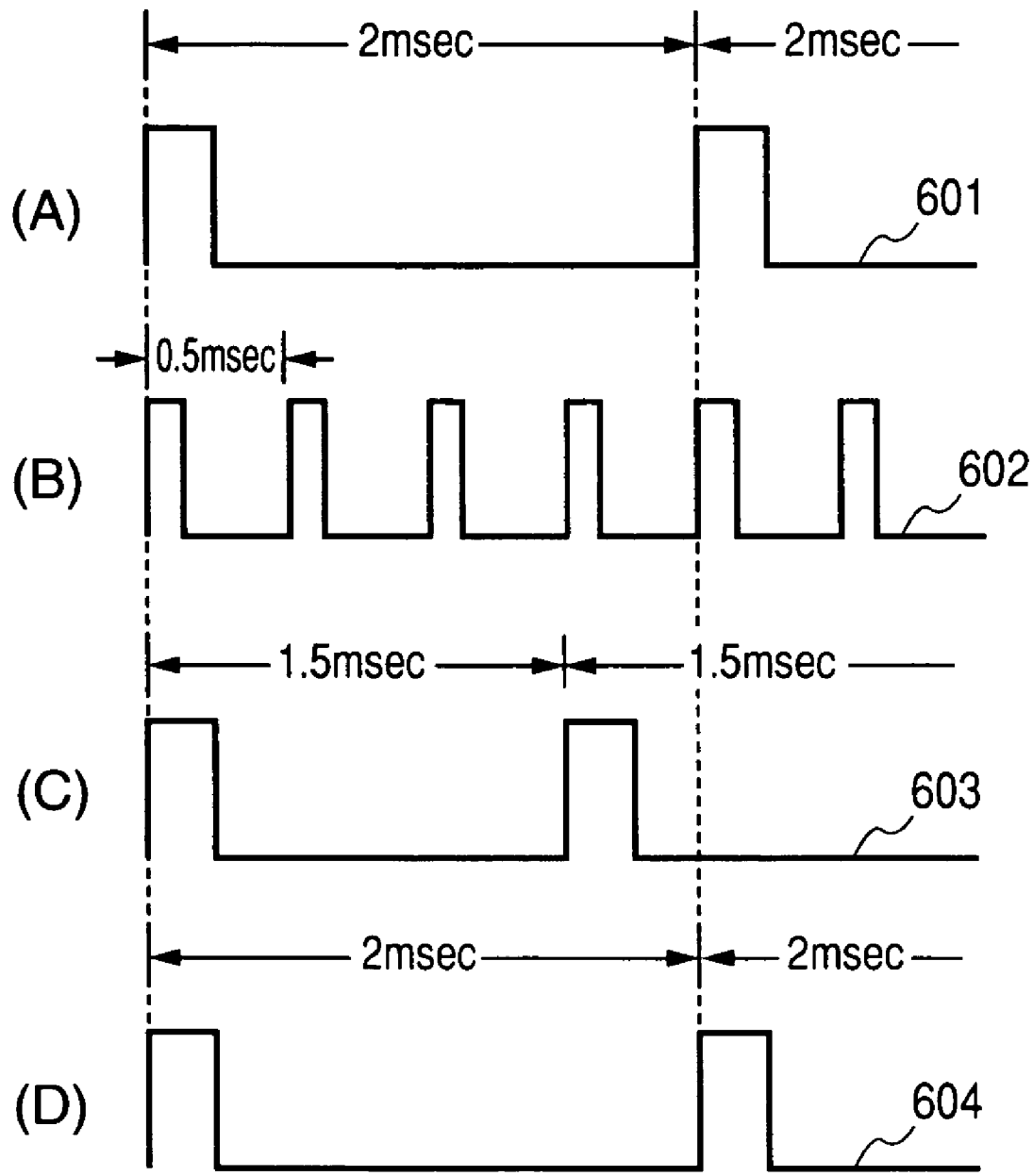
FIG. 6 is a timing chart to show an operation example of the pulse frequency adjustment circuit.

FIG. 6 is a timing chart to describe an operation example of the pulse frequency adjustment circuit 301 if the frequency (or pulse period) of the command pulse received by the pulse frequency adjustment circuit 301 is not a frequency (or pulse period) at which the step-out to be occured. In FIG. 6, (A) shows a command pulse 601 input to the pulse frequency adjustment circuit 301; (B) shows a reference clock pulse 602 generated by the reference clock generation unit 402; (C) shows a pulse signal 603 generated by the pulse generation unit 405; and (D) shows a pulse signal 604 output by the switch unit 406.

The command pulse 601 shown in (A) is a pulse train with pulse period 2 msec (which equals to pulse frequency 500 Hz, 500 pps) obtained as one pulse is output every two periodic interrupt processs in periodic interrupt process executed every millisecond (msec).

On the other hand, the reference clock pulse 602 shown in (B) is a pulse signal with pulse period 0.5 msec (which equals to pulse frequency 2 kHz, 2 kpps) like the reference clock pulse 502 shown in FIG. 5.

The first counter 401 issues a determination request to the determination unit 404 each time the counter counts two pulses to examine the pulse frequency or the pulse period of the command pulse 601. Upon reception of the determination request, the determination unit 404 references the count of the second counter 403 and determines whether or not the frequency (or pulse period) of the command pulse is a frequency (or pulse period) at which the step-out to be occured. If the count of the second counter 403 is equal to or less than "3", the determination unit 404 determines that the frequency (or pulse period) is the frequency (or pulse period) at which the step-out to be occured as previously described with reference to FIG. 5. In this case, the count of the second counter 403 becomes "4" and therefore the determination unit 404 commands the switch unit 406 to output the command pulse 601.

In FIG. 6, (C) shows the pulse signal 603 generated by the pulse generation unit 405, which is the same as the pulse signal 503 shown in FIG. 5. That is, the output pulse train of the pulse generation unit 405 is a pulse signal with pulse period of 1.5 msec (which nearly equals to pulse frequency 667 Hz).

Upon reception of the command of the determination unit 404, the switch unit 406 outputs the command pulse shown in (A). Consequently, if the pulse frequency adjustment circuit 301 receives a command pulse 601 with pulse period 2 msec (which equals to pulse frequency 500 Hz), it outputs the command pulse 601 intact (see (D) in FIG. 6, pulse signal 604).

When the pulse frequency adjustment circuit 301 determines that the frequency (or pulse period) of the command pulse received from the CPU 30 is the frequency (or pulse period) at which the step-out to be occured, the pulse frequency adjustment circuit 301 can output an alternative command pulse with a frequency (or pulse period) at/in which there is no fear of causing step-out to occur for preventing step-out from occurring.

Figure 7:
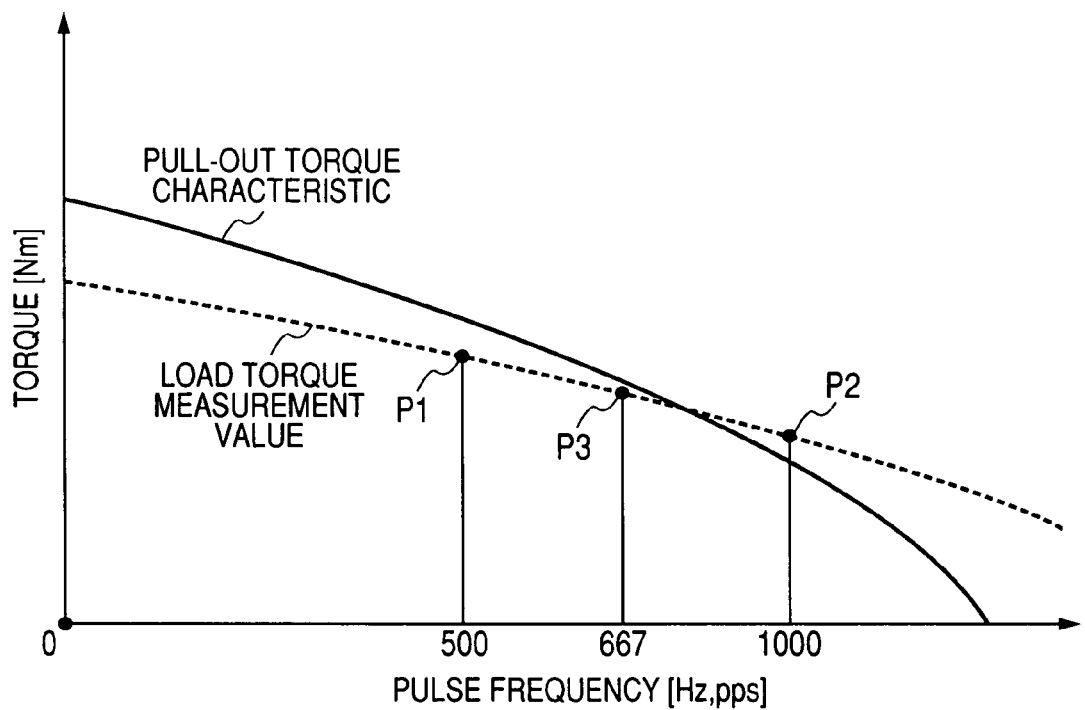
FIG. 7 is a graph to show the pull-out torque characteristic and the load characteristic of the stepping motor.

The frequency (or pulse period) at which the step-out to be occured may be determined as follows: FIG. 7 is a graph to show the pull-out torque characteristic and the load torque measurement values of the stepping motor 47.

The pull-out torque characteristic, which is also called continuous characteristic, indicates rotation can be continued if how much load torque is added when the motor is rotated according to command pulses with a given frequency. The load torque measurement values are the measurement values of the load torque actually imposed on the stepping motor if the motor is rotated according to command pulses with a given frequency. In the example shown in FIG. 7, the load characteristic falls below the pull-out torque characteristic at point P1 (pulse frequency 500 Hz) and therefore it can be determined that there is no fear of step-out. On the other hand, the load torque measurement value exceeds the pull-out torque characteristic at P2 (pulse frequency 1000 Hz) and therefore it can be determined that there is a fear of step-out. Then, if the pulse frequency adjustment circuit 301 receives a command pulse with the pulse frequency 1000 Hz, the pulse frequency adjustment circuit 301 outputs a pulse signal (alternative command pulse) corresponding to P3 (pulse frequency 667 Hz) to lower the frequency to the pulse frequency at which there is no fear of causing step-out to occur. Since the frequency of the alternative command pulse can be determined by the pulse generation unit 405, the pulse generation unit 405 may be set and designed so as to generate a pulse signal with any convenient pulse frequency.

Next, a configuration example of the motor driving circuit 302 will be discussed.

FIG. 8 is a block diagram to show a configuration example of the motor driving circuit 302. The motor driving circuit receives the command pulse through the pulse frequency adjustment circuit 301, and controls the stepping motor 47 to rotate on the basis of the command pulse. In the example shown in the figure, the motor driving circuit 302 includes a distribution circuit 801 and an excitation circuit 802.

The distribution circuit 801 is also called a logic sequencer and is a logic circuit being responsive to a command pulse for controlling excitation of the winding wires of the stepping motor 47 in order.

An output signal of the distribution circuit 801 is sent to an input terminal of the excitation circuit 802 for performing on/off control of current allowed to flow into the motor winding wires. Circuits of various configurations are generally used as the excitation circuit 802, but any may be used in the embodiment. If the output signal of the distribution circuit 801 is sufficient for driving the stepping motor 47, the excitation circuit 802 need not be installed.

3. Other Embodiments (1) In the embodiment described above, the frequency (or pulse period) at which the step-out to be occured is determined based on one limit value handled by the determination unit 404 (count 3 of the second counter 403). However, the determination unit 404 may be configured to perform the determination based on two or more limit values.

(2) In the embodiment of the pulse frequency adjustment circuit 301 shown in FIG. 4, the pulse frequency adjustment circuit 301 determines whether or not the frequency of the command pulse is the frequency at which the step-out of the stepping motor is to be caused. However, such determination may be performed by the CPU 30.

Figure 9:
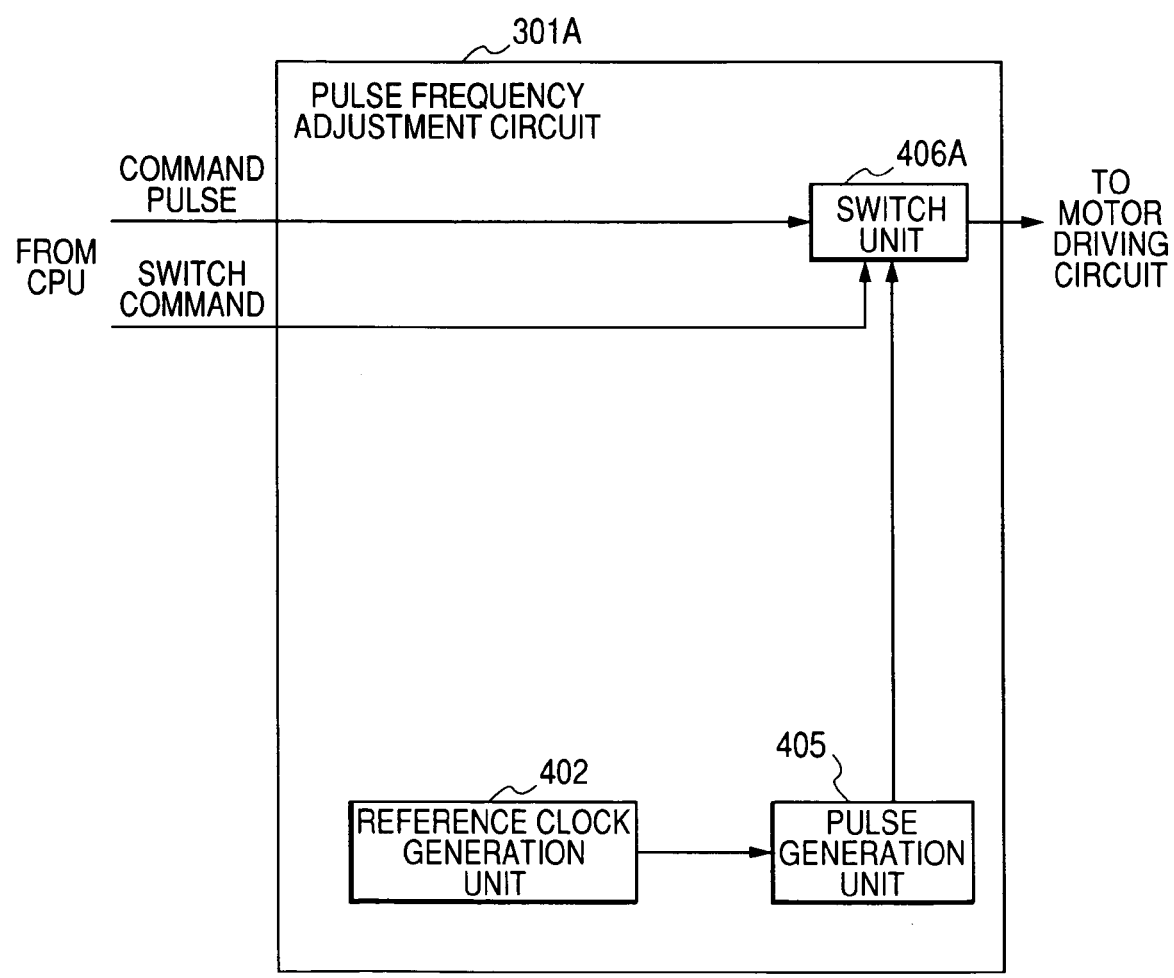
FIG. 9 is a block diagram to show another configuration example of the pulse frequency adjustment circuit.

FIG. 9 is a block diagram to show another embodiment of the pulse frequency adjustment circuit if the CPU 30 determines whether or not the frequency of the command pulse is the frequency at which the step-out of the stepping motor is to be caused.

In the embodiment shown in FIG. 9, the CPU 30 outputs a command pulse each time it executes N periodic interrupt processs (where N is a natural number), and determines whether or not the frequency of the command pulse is the frequency at which the step-out of the stepping motor is to be caused. When the frequency of the command pulse is the frequency at which the step-out of the stepping motor is to be caused, the CPU 30 outputs a switch command.

A pulse frequency adjustment circuit 301A includes: a reference clock generation unit 402 that generates a reference clock pulse; a pulse generation unit 405 that generates the alternative command pulse having the second frequency based on the reference clock pulse generated by the reference clock generation unit 402; and a switch unit 406A that outputs the command pulse to the motor driving circuit 302, and outputs the alternative command pulse to the motor driving circuit 302 instead of the command pulse when the switch command is received from the CPU 30 (external controller).

The stepping motor controller 45 described in the embodiments can be used not only for the stepping motors provided in the gaming machine, but also for the stepping motors provided in any other apparatuses.

As described with reference to the embodiments, there is provided following configurations.

(1) A stepping motor controller including: a pulse frequency adjustment circuit that receives a command pulse having a first frequency from an external controller that outputs the command pulse in accordance with an interrupt process performed periodically by the external controller, and generates an alternative command pulse having a second frequency that is lower than the first frequency; and a motor driving circuit that receives the command pulse through the pulse frequency adjustment circuit, and controls a stepping motor to rotate on the basis of the command pulse. The pulse frequency adjustment circuit outputs the alternative command pulse to the motor driving circuit instead of the command pulse received from the external controller, when the first frequency exceeds a predetermined level.

(2) A gaming machine including: a reel on a peripheral surface of which a plurality of symbols are arranged; a stepping motor that rotates the reel; a controller that outputs a command pulse in accordance with an interrupt process performed periodically; and a stepping motor controller. The stepping motor controller includes: a pulse frequency adjustment circuit that receives the command pulse having a first frequency from the controller, and generates an alternative command pulse having a second frequency that is lower than the first frequency; and a motor driving circuit that receives the command pulse through the pulse frequency adjustment circuit, and controls the stepping motor to rotate on the basis of the command pulse. The pulse frequency adjustment circuit outputs the alternative command pulse to the motor driving circuit instead of the command pulse received from the controller, when the first frequency exceeds a predetermined level.

(3) A gaming machine including: a stepping motor; a controller that outputs a command pulse in accordance with an interrupt process performed periodically; and a stepping motor controller that outputs to the stepping motor an excitation signal for driving the stepping motor based on the command pulse. When a frequency of the command pulse is a frequency at which a step-out of the stepping motor is to be caused, the stepping motor controller generates an alternative command pulse of a pulse signal having a lower frequency than the command pulse, and outputs the excitation signal for driving the stepping motor based on the alternative command pulse.

According to the above configurations, in a case where step-out is about to occur in the stepping motor, the stepping motor controller that is provided by a hardware configuration generates an alternative command pulse with a frequency (second frequency) at which step-out is not caused to occur and the alternative command pulse is used to drive the stepping motor. Accordingly, the step-out is prevented from occurring.

In the gaming machine according to (3), the stepping motor controller may be configured to include: a pulse frequency adjustment circuit that receives the command pulse from the controller, outputs the alternative command pulse when the frequency of the command pulse is a frequency at which the step-out of the stepping motor is to be caused, and outputs the command pulse when the frequency of the command pulse is not a frequency at which the step-out of the stepping motor is to be caused; and a motor driving circuit that controls excitation of a plurality of winding wires in order on the basis of the command pulse, the winding wires being provided in the stepping motor.

According to the gaming machine thus configured, the frequency of the command pulse generated as the CPU executes software (interrupt process performed periodically) is adjusted by hardware (stepping motor controller), whereby it is made possible to prevent step-out from occurring.

In the gaming machine according to (3), the controller may be configured to determine whether or not the frequency of the command pulse is a frequency at which the step-out of the stepping motor is to be caused, and to output a switch command when determined that the frequency of the command pulse is a frequency at which the step-out of the stepping motor is to be caused. The stepping motor controller may be configured to include: a pulse frequency adjustment circuit that receives the command pulse from the controller, and selectively outputs one of the command pulse and the alternative command pulse in response to the switch command; and a motor driving circuit that controls excitation of a plurality of winding wires in order on the basis of the command pulse, the winding wires being provided in the stepping motor.

According to the gaming machine thus configured, the frequency of the command pulse generated as the CPU executes software (period interrupt service) is adjusted by hardware (stepping motor controller) under the control of the CPU, whereby it is made possible to prevent step-out from occurring.

In the stepping motor controller and the gaming machine, the pulse frequency adjustment circuit may be configured to generate the alternative command pulse having the second frequency F that satisfies the following relational expression of:

$$1/(N \cdot T) < F < 1/\{(N+1) \cdot T\}$$

wherein N is a natural number, and T is a cycle of the interrupt process performed periodically by the external controller.

According to the configuration of the above, it is made possible to generate a pulse signal with a frequency in an intermediate step (for example, frequency between $1/T$ and $1/(2T)$) without being limited to the command pulse frequency that can be generated by periodic interrupt process by the CPU, and it is made possible to circumvent abrupt change in the number of revolutions of the stepping motor.

According to the embodiments, in a case where the command pulse of the stepping motor for rotating the reel of a gaming machine is generated under the control of the interrupt service performed by a software executed by the CPU (controller; external controller), it is made possible to generate a command pulse with a pulse frequency in an intermediate step without being limited to the interrupt service execution intervals of software.

The foregoing description of the embodiments has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A stepping motor controller comprising:
   a pulse frequency adjustment circuit that receives a command pulse having a first frequency from an external controller that outputs the command pulse in accordance with an interrupt process performed periodically by the external controller, and generates an alternative command pulse having a second frequency that is lower than the first frequency, wherein the second frequency is generated based on a reference clock pulse having a predetermined frequency generated by a reference clock generation unit; and
   a motor driving circuit that receives the command pulse through the pulse frequency adjustment circuit, and controls a stepping motor to rotate on the basis of the command pulse,
   wherein the pulse frequency adjustment circuit outputs the alternative command pulse to the motor driving circuit instead of the command pulse received from the external controller, when the first frequency exceeds a predetermined level,
   wherein the pulse frequency adjustment circuit comprises:
      a first counter that counts a first pulse number of the command pulse received from the external controller;
      a second counter that counts a second pulse number of the reference clock pulse generated by the reference clock generation unit;
      a pulse generation unit that generates the alternative command pulse having the second frequency based on the reference clock pulse generated by the reference clock generation unit;
      a determination unit that determines whether to output the alternative command pulse to the stepping motor instead of the command pulse received from the external controller, by comparing the first pulse number and the second pulse number; and
      a switch unit that outputs one of the command pulse and the alternative command pulse to the motor driving circuit in accordance with the determination made by the determination unit.

2. The stepping motor controller according to claim 1, wherein the predetermined level is a frequency that causes the stepping motor to step-out.

3. The stepping motor controller according to claim 1, wherein the pulse frequency adjustment circuit is provided with a memory device that stores the predetermined level.

4. The stepping motor controller according to claim 1, wherein the motor driving circuit comprises a distribution circuit that receives the command pulse output from the pulse frequency adjustment circuit, and controls excitation of a plurality of winding wires in order on the basis of the command pulse, the winding wires being provided in the stepping motor.

5. The stepping motor controller according to claim 4, wherein the motor driving circuit further comprises an excitation circuit that outputs an excitation signal to the winding wires in accordance with the control by the distribution circuit.

6. The stepping motor controller according to claim 1, wherein
   the switch unit that outputs the command pulse to the motor driving circuit, and outputs the alternative command pulse to the motor driving circuit instead of the command pulse when a switch command is received from the external controller.

7. The stepping motor controller according to claim 1, wherein the pulse frequency adjustment circuit generates the alternative command pulse having the second frequency F that satisfies the following relational expression of:

$$1/(N \cdot T) < F < 1/\{(N+1) \cdot T\}$$

wherein N is a natural number, and T is a cycle of the interrupt process performed periodically by the external controller.

8. A gaming machine comprising:
   a reel on a peripheral surface of which a plurality of symbols are arranged;
   a stepping motor that rotates the reel;
   a controller that outputs a command pulse in accordance with an interrupt process performed periodically; and
   a stepping motor controller that comprises:
      a pulse frequency adjustment circuit that receives the command pulse having a first frequency from the controller, and generates an alternative command pulse having a second frequency that is lower than the first frequency, wherein the second frequency is generated based on a reference clock pulse having a predetermined frequency generated by a reference clock generation unit; and
      a motor driving circuit that receives the command pulse through the pulse frequency adjustment circuit, and controls the stepping motor to rotate on the basis of the command pulse,
   wherein the pulse frequency adjustment circuit outputs the alternative command pulse to the motor driving circuit instead of the command pulse received from the controller, when the first frequency exceeds a predetermined level,
   wherein the pulse frequency adjustment circuit comprises:
      a first counter that counts a first pulse number of the command pulse received from the external controller;
      a second counter that counts a second pulse number of the reference clock pulse generated by the reference clock generation unit;
      a pulse generation unit that generates the alternative command pulse having the second frequency based on the reference clock pulse generated by the reference clock generation unit;
      a determination unit that determines whether to output the alternative command pulse to the stepping motor instead of the command pulse received from the external controller, by comparing the first pulse number and the second pulse number; and
      a switch unit that outputs one of the command pulse and the alternative command pulse to the motor driving circuit in accordance with the determination made by the determination unit.

9. The gaming machine according to claim 8, wherein the predetermined level is a frequency that causes the stepping motor to step-out.

10. The gaming machine according to claim 8, wherein the pulse frequency adjustment circuit is provided with a memory device that stores the predetermined level.

11. The gaming machine according to claim 8, wherein the motor driving circuit comprises a distribution circuit that receives the command pulse output from the pulse frequency adjustment circuit, and controls excitation of a plurality of winding wires in order on the basis of the command pulse, the winding wires being provided in the stepping motor.

12. The gaming machine according to claim 11, wherein the motor driving circuit further comprises an excitation circuit that outputs an excitation signal to the winding wires in accordance with the control by the distribution circuit.

13. The gaming machine according to claim 8, wherein
the switch unit that outputs the command pulse to the motor driving circuit, and outputs the alternative command pulse to the motor driving circuit instead of the command pulse when a switch command is received from the external controller.

14. The gaming machine according to claim 8, wherein the pulse frequency adjustment circuit generates the alternative command pulse having the second frequency F that satisfies the following relational expression of:

$$1/(N \cdot T) < F < 1/\{(N+1) \cdot T\}$$

wherein N is a natural number, and T is a cycle of the interrupt process performed periodically by the external controller.

15. A gaming machine comprising:
a stepping motor;
a controller that outputs a command pulse in accordance with an interrupt process performed periodically; and
a stepping motor controller that outputs to the stepping motor an excitation signal for driving the stepping motor based on the command pulse,
wherein, when a frequency of the command pulse is a frequency at which a step-out of the stepping motor is to be caused, the stepping motor controller generates an alternative command pulse of a pulse signal having a lower frequency than the command pulse, and outputs the excitation signal for driving the stepping motor based on the alternative command pulse, wherein the alternative command pulse is generated based on a reference clock pulse having a predetermined frequency generated by a reference clock generation unit,
wherein the pulse frequency adjustment circuit generates the alternative command pulse having the second frequency F that satisfies the following relational expression of:

$$1/(N \cdot T) < F < 1/\{(N+1) \cdot T\}$$

wherein N is a natural number, and T is a cycle of the interrupt process performed periodically by the external controller.

16. The gaming machine according to claim 15, wherein the stepping motor controller comprises:
a pulse frequency adjustment circuit that receives the command pulse from the controller, outputs the alternative command pulse when the frequency of the command pulse is a frequency at which the step-out of the stepping motor is to be caused, and outputs the command pulse when the frequency of the command pulse is not a frequency at which the step-out of the stepping motor is to be caused; and
a motor driving circuit that controls excitation of a plurality of winding wires in order on the basis of the command pulse, the winding wires being provided in the stepping motor.

17. The gaming machine according to claim 15, wherein the controller determines whether or not the frequency of the command pulse is a frequency at which the step-out of the stepping motor is to be caused, and outputs a switch command when determined that the frequency of the command pulse is a frequency at which the step-out of the stepping motor is to be caused, and
wherein the stepping motor controller comprises:
a pulse frequency adjustment circuit that receives the command pulse from the controller, and selectively outputs one of the command pulse and the alternative command pulse in response to the switch command; and
a motor driving circuit that controls excitation of a plurality of winding wires in order on the basis of the command pulse, the winding wires being provided in the stepping motor.

* * * * *